United States Patent
Wu et al.

(10) Patent No.: US 8,657,600 B2
(45) Date of Patent: Feb. 25, 2014

(54) PLASTIC MATERIAL INJECTION MOLDING SYSTEM

(75) Inventors: Hsien-Ming Wu, New Taipei (TW); Chao-Hung Lin, New Taipei (TW)

(73) Assignee: Quanta Computer Inc., Taoyuan Shien (TW)

( * ) Notice: Subject to any disclaimer, the term of this patent is extended or adjusted under 35 U.S.C. 154(b) by 349 days.

(21) Appl. No.: 13/191,667

(22) Filed: Jul. 27, 2011

(65) Prior Publication Data
US 2012/0195996 A1 Aug. 2, 2012

(30) Foreign Application Priority Data
Feb. 1, 2011 (TW) .............................. 100103918 A

(51) Int. Cl.
*B29C 45/27* (2006.01)
*B29C 45/28* (2006.01)

(52) U.S. Cl.
USPC .......................... 425/567; 425/568; 425/569

(58) Field of Classification Search
USPC .......................... 425/441, 542, 567, 568, 569
See application file for complete search history.

(56) References Cited

U.S. PATENT DOCUMENTS

| | | | | |
|---|---|---|---|---|
| 3,010,154 A * | 11/1961 | Swenson | ....................... | 425/449 |
| 3,642,392 A * | 2/1972 | Vanderhagen | ................ | 425/4 R |
| 3,690,806 A * | 9/1972 | Kovacs | ......................... | 425/467 |
| 3,813,014 A * | 5/1974 | Guerin | ........................ | 222/413 |
| 3,985,490 A * | 10/1976 | Kader | ........................ | 425/381 |
| 4,094,447 A * | 6/1978 | Gellert | ....................... | 222/146.5 |
| 4,208,178 A * | 6/1980 | Przytulla | ...................... | 425/467 |
| 4,540,534 A | 9/1985 | Grendol | | |
| 4,591,274 A * | 5/1986 | Sulin | ............................ | 366/336 |
| 4,653,995 A * | 3/1987 | Ward | ............................. | 425/190 |
| 4,680,003 A * | 7/1987 | Schulte et al. | ................ | 425/206 |
| 4,832,593 A * | 5/1989 | Brown | ........................ | 425/564 |
| 4,895,503 A * | 1/1990 | Proska et al. | ................ | 425/127 |
| 6,106,275 A * | 8/2000 | Huff et al. | .................... | 425/563 |
| 6,382,528 B1 * | 5/2002 | Bouti | ............................ | 239/489 |
| 6,607,688 B1 * | 8/2003 | Vogliano et al. | ........... | 264/328.2 |
| 2001/0026819 A1 | 10/2001 | Gould et al. | ................. | 425/572 |
| 2004/0166195 A1 * | 8/2004 | Trudeau | ...................... | 425/568 |
| 2005/0031728 A1 * | 2/2005 | Babin et al. | ................... | 425/549 |
| 2006/0099296 A1 * | 5/2006 | Wurstlin | ...................... | 425/568 |
| 2006/0204610 A1 * | 9/2006 | Nakaya et al. | ............... | 425/567 |
| 2006/0286197 A1 * | 12/2006 | Manda et al. | ................ | 425/572 |
| 2009/0236774 A1 * | 9/2009 | Blais et al. | ................. | 264/328.8 |
| 2010/0104685 A1 * | 4/2010 | Dufner | ........................ | 425/547 |
| 2011/0305790 A1 * | 12/2011 | Lin | .............................. | 425/567 |

* cited by examiner

*Primary Examiner* — Yogendra Gupta
*Assistant Examiner* — Emmanuel S Luk
(74) *Attorney, Agent, or Firm* — Rabin & Berdo, P.C.

(57) ABSTRACT

A plastic material injection molding system includes a feeding nozzle, a forming mold having a cave therein, and a material-passing mold having a runner therein. The runner communicates both the feeding nozzle and the cave, and has two curved parts therein for slowing down the plastic material injected from the feeding nozzle in order.

4 Claims, 4 Drawing Sheets

PLASTIC MATERIAL INJECTION MOLDING SYSTEM

RELATED APPLICATIONS

This application claims priority to Taiwanese Application Serial Number 100103918, filed Feb. 1, 2011, which is herein incorporated by reference.

BACKGROUND

1. Technical Field

The present invention relates to a molding system, more particular to a plastic material injection molding system.

2. Description of Related Art

In a process of making a plastic product by a conventional injection molding method, mold designs, plastic material qualities, plastic material feeding pressures or internal parameters (e.g. time, temperature, pressure, flow speed) of plastic material in mold may be one of the factors for the plastic product to be imperfect. Commonly, these imperfections can be wrinkles, blisters, scrapes, granulations or feeding-point shadows formed on a surface of the plastic product etc.

Refer to FIG. 1 in which FIG. 1 is a top view of a plastic product P made by a conventional injection molding method. Regarding to the so-called feeding-point shadow D, after the plastic product P is formed in the mold, the feeding-point shadow D is always existed, corresponding to the position of feeding-point, on a surface of the plastic product P opposite to the feeding-point of the mold. Thus, comparing to other area of the surface of the plastic product P, the feeding-point shadow D is with a darker color so as to cause uneven quality of color of the plastic product P.

Therefore, since the plastic product made by the conventional injection molding method mentioned above still obviously exists inconveniences and disadvantages which are needed to be improved, especially to the feeding-point shadow of the plastic product.

SUMMARY

The present invention is to disclose a plastic material injection molding system, which can provide a plastic product without feeding-point shadows thereon by an injection molding method.

The present invention is to disclose a plastic material injection molding system, which can decrease the boosting pressure of the plastic material being fed into the mold so as to provide a plastic product with consistent color and brightness on appearance, and reduce possibilities that feeding-point shadows existed on the surface of the plastic product when the plastic product is formed.

According to one practice of the invention, the plastic material injection molding system comprises a feeding nozzle, a forming mold and a material-passing mold. The feeding nozzle feeds liquid plastic material to the forming mold via the material-passing mold. The forming mold is provided with a forming cavity therein, and the forming cavity forms the liquid plastic material into a plastic product. The material-passing mold is disposed between the feeding nozzle and the forming mold. The material-passing mold is provided with a material-feeding runner therein, the material-feeding runner is in communication with both the feeding nozzle and the forming cavity. The material-feeding runner comprises a first bending section and a second bending section. The first bending section and the second bending section decrease flow speed and boosting pressure of the liquid plastic material sequentially.

In one embodiment of the practice, the material-feeding runner further comprises a U-turn section. The U-turn section is disposed between the forming cavity and the second bending section. Thus, when the liquid plastic material in the material-feeding runner travels to the material-passing mold via the U-turn section, a traveling journey of the liquid plastic material to the material-passing mold can be extended so that the flow speed and the boosting pressure of the liquid plastic material can be further decelerated again. Furthermore, the space of the U-turn section is shrunk gradually towards a direction far away from the second bending section.

In another embodiment of the practice, the material-passing mold further comprises a male die block and a female die block capable of assembling together. The male die block has a first waved surface at one side thereof. The female die block has a recess and a second waved surface at one side thereof, and the second waved surface is an inner surface of the recess. After the male die block and the female die block are assembled together, wave peaks and wave troughs of the first waved surface and wave peaks and wave troughs of the second waved surface are staggered so as to form the first bending section and the second bending section.

In the embodiment, the female die block further comprises a protrusion connected the second waved surface, and extended from the second waved surface towards the first waved surface. The protrusion is located at the first bending section, and is vertically aligned with the feeding nozzle for guiding the liquid plastic material to the second bending section.

In another embodiment of the practice, the material-feeding runner further comprises a buffer section. The buffer section is disposed between the feeding nozzle and the first bending section for buffering the liquid plastic material.

To sum up, since the plastic material injection molding system of the invention is designed for decreasing flow speed and boosting pressure of the liquid plastic material, the liquid plastic material can be filled in the forming cavity uniformly and sequentially before the plastic product is formed, so as to reduce possibilities that feeding-point shadows existed on the surface of the plastic product to degrade the plastic product with inconsistent color and brightness on appearance.

BRIEF DESCRIPTION OF THE DRAWINGS

The present invention will be apparent to those skilled in the art by reading the following detailed description of a preferred embodiment thereof, with reference to the attached drawings, in which.

DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
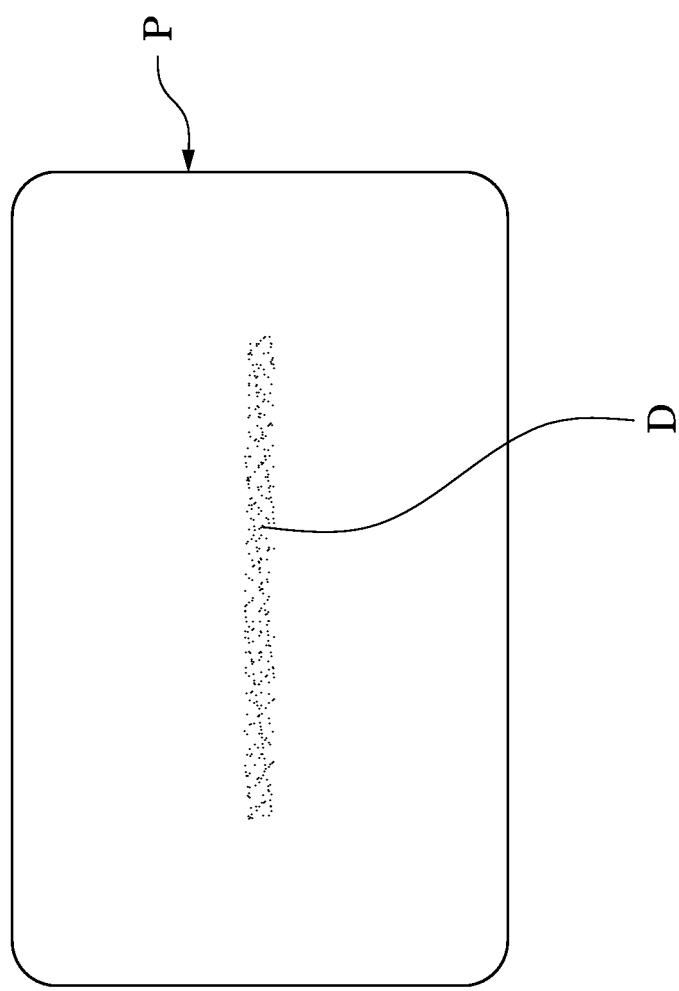
FIG. 1 is a top view of a plastic product made by a conventional injection molding method.

Since the plastic product P made by the conventional injection molding method mentioned above always exists with imperfections of the feeding-point shadow D (FIG. 1) on the surface of the plastic product P, thus, the feeding-point shadow D is with a darker color so as to cause uneven quality of color on the integral appearance. Therefore, after analyzing and researching constantly by the inventor of the present invention, the inventor has found the main reason why the feeding-point shadow D generated on the surface of the plastic product P, that is, the boosting pressure of the plastic material being filled into the mold is so huge, thus, when the plastic material is delivered into a cavity of the mold, the beginning part of the plastic material impacts to the inner surface of the cavity and spreads radially neighboring to a center portion thereof so that the beginning part and the following part of the plastic material are not hardened simultaneously (i.e. the beginning part of the plastic material is quicker to be hardened than the following part of the plastic material to be hardened). Therefore, there are different in color and brightness on appearance of the surface of the plastic product.

As a result, the inventor provides a plastic material injection molding system capable of slowing down the boosting pressure of the plastic material being filled into the mold so as to reduce possibilities of the feeding-point shadows existed on the surface of the plastic product to improve consistent color and brightness on appearance of the plastic product.

Figure 2:
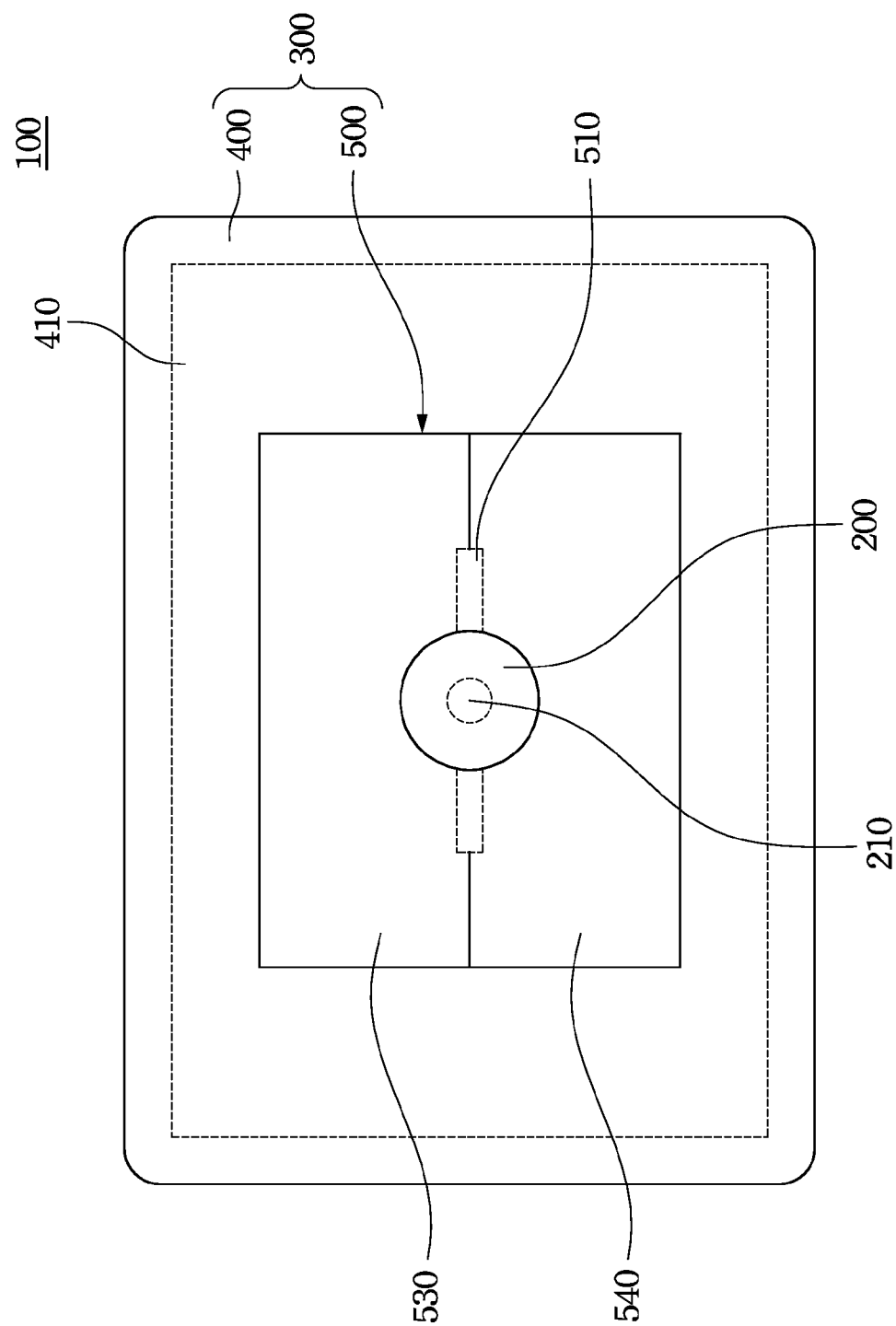
FIG. 2 is a top view of a plastic material injection molding system according to an embodiment of the present invention.
Figure 3:
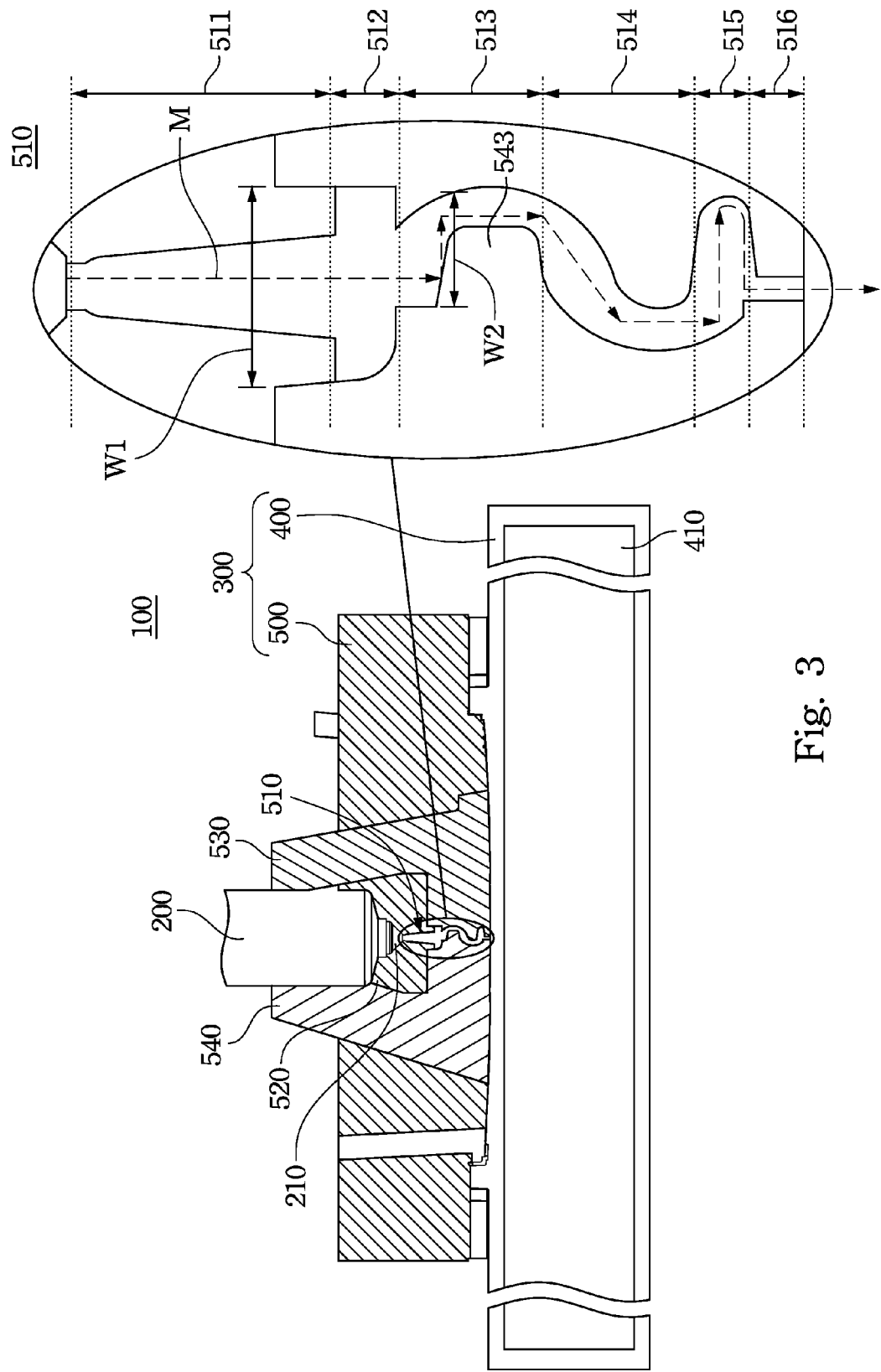
FIG. 3 is a section view of the plastic material injection molding system and an enlarged view of a material-feeding runner according to the embodiment of the present invention.

Refer to FIG. 2 and FIG. 3 in which FIG. 2 is a top view of a plastic material injection molding system according to an embodiment of the present invention, and FIG. 3 is a section view of the plastic material injection molding system and an enlarged view of a material-feeding runner according to the embodiment of the present invention.

The plastic material injection molding system 100 comprises a material-feeding element 200 and a forming mold device 300. The forming mold device 300 comprises a forming mold 400 and a material-passing mold 500. The material-feeding element 200 is provided with a material-feeding nozzle 210. The material-feeding element 200 connects a material-supply end so that the material-feeding element 200 can inject liquid plastic material M (e.g. Polyvinyl chloride, PVC or Acrylonitrile Butadiene Styrene, ABS) with high temperature and high pressure by the material-feeding nozzle 210. The forming mold 400 is assembled by at least two die blocks forming a forming cavity 410 therein after the die blocks assembled. The liquid plastic material M is formed into a plastic product (e.g. external case and plastic component) through the forming cavity 410 of the forming mold 400.

The material-passing mold 500 can be independent to or separated from the forming mold 400 and the material-feeding element 200, and the material-passing mold 500 also can be assembled with the forming mold 400 and the material-feeding element 200 so that the material-passing mold 500 is disposed between the forming mold 400 and the material-feeding element 200.

The material-passing mold 500 is provided with a material-feeding runner 510 formed therein as a tunnel. Two opposite ends of the material-feeding runner 510 are respectively communicated with the material-feeding nozzle 210 and the forming cavity 410. Thus, the material-feeding runner 510 guides the liquid plastic material M injected from the material-feeding nozzle 210 to the forming cavity 410.

Substantially, the material-feeding runner 510 is outlined as an "S" letter, and the material-feeding runner 510 comprises a first bending section 513 and a second bending section 514 connected continually to the first bending section 513.

Therefore, after the material-feeding nozzle 210 injects a continuous stream of liquid plastic material M into the forming cavity 410 via the material-feeding runner 510, the liquid plastic material M sequentially pass through the first bending section 513 and the second bending section 514 before the liquid plastic material M entering into the forming cavity 410.

Since the first bending section 513 and the second bending section 514 are non-linear, comparing to other linear passages, the first bending section 513 and the second bending section 514 can respectively extend a traveling journey of the liquid plastic material M so as to decelerate the flow speed of the liquid plastic material M.

Since the flow speed of the liquid plastic material M is slowed down by the first bending section 513 and the second bending section 514, the boosting pressure of the liquid plastic material M is decreased as well. On the other words, the first bending section 513 and the second bending section 514 can help to decrease the boosting pressure of the liquid plastic material M in the material-feeding runner 510.

Thus, when the beginning part and the following part of the liquid plastic material M filled into the cavity, the beginning part and the following part of the liquid plastic material M will not cause that the beginning part and the following part of the liquid plastic material M are not hardened simultaneously or the beginning part thereof is hardened quickly than the following part thereof, so that the beginning part and the following part of the liquid plastic material M are similar in color and brightness on appearance of the surface of the plastic product.

In one embodiment of the invention, the material-feeding runner 510 further comprises an inlet section 511 and a buffer section 512. The inlet section 511 is substantially presented as a linear passage, arranged between the buffer section 512 and the material-feeding nozzle 210, and directly communicated both the buffer section 512 and the material-feeding nozzle 210. The buffer section 512 is arranged between the inlet section 511 and the first bending section 513 and directly communicated both the inlet section 511 and the first bending section 513. Since a width W1 of the buffer section 512 is larger than a width W2 of the first bending section 513, thus, the buffer section 512 play as a buffer before the liquid plastic material M ready get into the first bending section 513.

In the embodiment, the material-feeding runner 510 further comprises a U-turn section 515 and an outlet section 516. The "U-turn" means the flow direction, not the shape of the section 515. The U-turn section 515 is adjacent to the second bending section 514, and the U-turn section 515 is arranged between the forming cavity 410 and the second bending section 514. The outlet section 516 is substantially presented as a linear passage, and arranged between the U-turn section 515 and the forming cavity 410, and directly communicated both the U-turn section 515 and the forming cavity 410. Further, a lateral side of the outlet section 516 is connected to the left side of U-turn section 515 as same as a lateral side that the second bending section 514 connects to the left side of U-turn section 515.

As such, simultaneously refer to a dotted arrow in FIG. 3 as a traveling journey of the liquid plastic material M, when the liquid plastic material M is flowed into the U-turn section 515 through the second bending section 514, the inner surface of the U-turn section 515 far away from the second bending section 514 (i.e. right side of the inner surface of the U-turn section 515) stops and redirects the liquid plastic material M to the left side of the inner surface of the U-turn section 515 in opposite so as to guide the liquid plastic material M into the forming cavity 410.

Since the U-turn section 515 extends the traveling journey of the liquid plastic material M, the U-turn section 515 further decelerates the flow speed of the liquid plastic material M, on the other word, the U-turn section 515 decreases the boosted pressure of the liquid plastic material M.

Furthermore, in one preferred embodiment, the space of the U-turn section 515 is shrunk gradually towards a direction far away from the second bending section 514 so as to lead the liquid plastic material M to the left side of the U-turn section 515. The caliber of the U-turn section 515 on the right side is also shrunk gradually towards the left side of the U-turn section 515 so as to lead the liquid plastic material M being far away from the second bending section 514.

Figure 4:
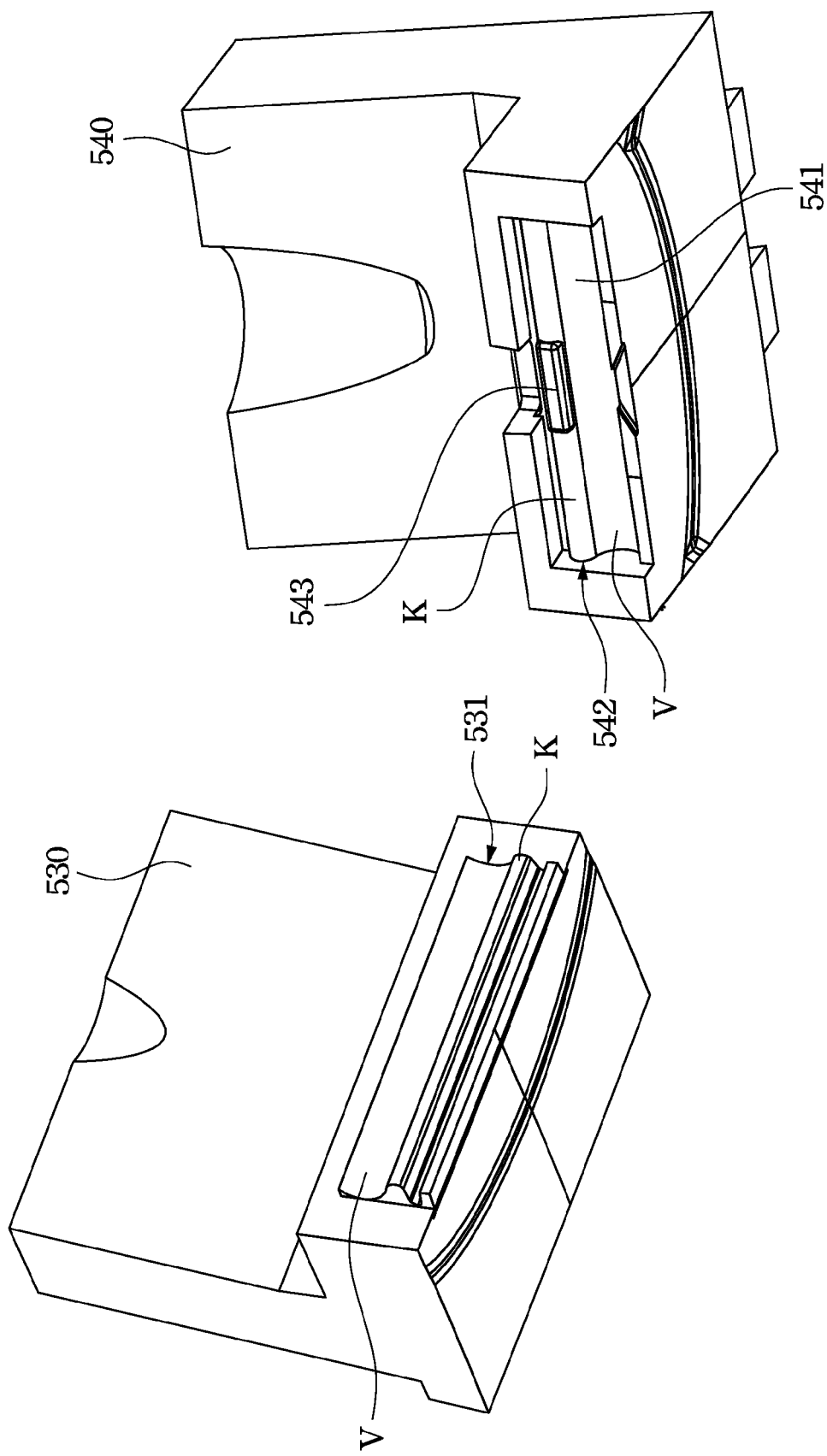
FIG. 4 is a perspective view of a male die block and female die block according to the embodiment of the present invention.

Refer to FIG. 2 and FIG. 4 in which FIG. 4 is a perspective view of a male die block and female die block according to the embodiment of the present invention.

In one optional embodiment of the invention, the material-passing mold 500 further comprises a connection block 520, a male die block 530, and a female die block 540 in which the male die block 530 and the female die block 540 are capable of assembling together. The male die block 530 has a first waved surface 531 at one side thereof (FIG. 4). The female die block 540 has a recess 541 and a second waved surface 542 at one side thereof (FIG. 4), and the second waved surface 542 is an inner surface of the recess 541. The inlet section 511 of the material-feeding runner 510 is disposed inside the connection block 520.

After the male die block 530 and the female die block 540 are assembled together, wave peaks K and wave troughs V of the first waved surface 531 and wave peaks K and wave troughs V of the second waved surface 542 are staggered so as to form the buffer section 512, the first bending section 513, the second bending section 514, and the U-turn section 515 therebetween (FIG. 2).

Also, after the male die block 530 and the female die block 540 are assembled together, the connection block 520 is installed between the material-feeding nozzle 210, the male die block 530 and the female die block 540, thus, the inlet section 511, the buffer section 512, the first bending section 513, the second bending section 514, and the U-turn section 515 can be integrated substantially as the material-feeding runner 510 (FIG. 2).

In the embodiment of the invention, the female die block 540 further comprises a protrusion 543. The protrusion 543 is located at a wave peak K of the second waved surface 542, and extended from the second waved surface 542 towards the first waved surface 531, and the protrusion 543 is in the first bending section 513 and is vertically aligned with the buffer section 512 and the feeding nozzle 210 for guiding the liquid plastic material to the second bending section 514.

Therefore, when the liquid plastic material M vertically enters into the first bending section 513 via the inlet section 511 and the buffer section 512 (FIG. 2), since the protrusion 543 is straightly aligned with the feeding nozzle 210, the liquid plastic material M is resisted by the protrusion 543 and the liquid plastic material M can flow through the first bending section 513 and the second bending section 514. Therefore, since the protrusion 543 resists the high-pressured liquid plastic material M, the protrusion 543 can slow down the flow speed of the high-pressured liquid plastic material M, on the other word, the pressure of the liquid plastic material M also may be decreased.

Although the present invention has been described with reference to the preferred embodiments thereof, it is apparent to those skilled in the art that a variety of modifications and changes may be made without departing from the scope of the present invention which is intended to be defined by the appended claims.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A plastic material injection molding system, comprising:
a feeding nozzle for feeding liquid plastic material; and
a forming mold device comprising:
   a forming mold having a forming cavity therein; and
   a material-passing mold disposed between the feeding nozzle and the forming mold, and having a material-feeding runner therein in communication with both the feeding nozzle and the forming cavity, the material-feeding runner comprising:
      an inlet section directly in communication with the feeding nozzle;
      a buffer section, the inlet section being arranged between the buffer section and the feeding nozzle, and being directly in communication with the buffer section;
      a first bending section, the buffer section being arranged between the inlet section and the first bending section, and being directly in communication with the first bending section, a width of the buffer section being larger than a width of the first bending section and a width of the inlet section; and
      a second bending section, the first bending section being arranged between the buffer section and the second bending section, and being in communication with the second bending section;
      a U-turn section, the second bending section being arranged between the first bending section and the U-turn section, and being in communication with the first bending section and the U-turn section; and
      an outlet section arranged between the U-turn section and the forming cavity, and being in communication with the U-turn section and the forming cavity,
   wherein both of the second bending section and the outlet are connected to a same side of the U-turn section, and a caliber of the U-turn section shrinks gradually from the same side of the U-turn section towards an opposite side of the U-turn section, which is away from the second bending section.

2. The plastic material injection molding system according to claim 1, wherein the material-passing mold further comprises:
a male die block having a first waved surface at one side thereof;

a female die block having a recess and a second waved surface at one side thereof, wherein the second waved surface is an inner surface of the recess, wherein after the male die block and the female die block are assembled together, wave peaks and wave troughs of the first waved surface and wave peaks and wave troughs of the second waved surface are staggered so as to form the first bending section and the second bending section.

3. The plastic material injection molding system according to claim 2, wherein the male die block further comprises:

a protrusion located at the first bending section, and extending from the second waved surface towards the first bending section.

4. A forming mold device served for connecting a feeding nozzle, comprising:

a forming mold having a forming cavity therein; and a material-passing mold having a material-feeding runner therein, the material-feeding runner being arranged between the forming mold and the feeding nozzle, being in communication with both the feeding nozzle and the forming cavity, and comprising an inlet section, a buffer section, a first bending section, a second bending section connected continually to the first bending section, a U-turn section and an outlet section, the inlet section being arranged between the buffer section and the feeding nozzle, and being directly in communication with the buffer section and the feeding nozzle, the buffer section being arranged between the inlet section and the first bending section and being directly in communication with the first bending section, a width of the buffer section being larger than a width of the first bending section and a width of the inlet section, the second bending section being arranged between the first bending section and the U-turn section, and being in communication with the first bending section and the U-turn section, and the outlet section being arranged between the U-turn section and the forming cavity, and being in communication with the U-turn section and the forming cavity, wherein both of the second bending section and the outlet section are connected to a same side of the U-turn section, and a caliber of the U-turn section shrinks gradually from the same side of the U-turn section towards an opposite side of the U-turn section, which is away from the second bending section.

\* \* \* \* \*